US008603335B2

(12) United States Patent
Beard et al.

(10) Patent No.: US 8,603,335 B2
(45) Date of Patent: *Dec. 10, 2013

(54) FILTER WITH EJECTION MECHANISM

(75) Inventors: John H. Beard, Kearney, NE (US);
Farrell F. Calcaterra, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/547,235

(22) Filed: Jul. 12, 2012

(65) Prior Publication Data
US 2012/0273406 A1 Nov. 1, 2012

Related U.S. Application Data

(63) Continuation of application No. 12/139,559, filed on Jun. 16, 2008, now Pat. No. 8,241,493.

(51) Int. Cl.
*B01D 27/08* (2006.01)
*B01D 35/30* (2006.01)

(52) U.S. Cl.
USPC ............ 210/238; 210/232; 210/234; 210/237

(58) Field of Classification Search
USPC ....................................................... 210/238
See application file for complete search history.

(56) References Cited

U.S. PATENT DOCUMENTS

| | | |
|---|---|---|
| 1,761,924 A | 6/1930 | Kamrath |
| 3,361,260 A | 1/1968 | Buckman |
| 3,370,708 A | 2/1968 | Hultgren et al. |
| 3,384,241 A | 5/1968 | Nostrand |
| 3,420,377 A | 1/1969 | Vandersip |
| 3,988,244 A | 10/1976 | Brooks |
| 4,372,847 A | 2/1983 | Lewis |
| 4,812,235 A | 3/1989 | Seleman et al. |
| 4,915,831 A | 4/1990 | Taylor |
| 5,078,877 A | 1/1992 | Cudaback et al. |
| 5,102,541 A | 4/1992 | Breitbach |
| 5,203,994 A | 4/1993 | Janik |
| 5,215,658 A | 6/1993 | Luby |
| 5,259,953 A | 11/1993 | Baracchi et al. |
| 5,302,284 A | 4/1994 | Zeiner et al. |
| 5,342,511 A | 8/1994 | Brown et al. |
| 5,350,506 A | 9/1994 | Dombek et al. |
| 5,362,390 A | 11/1994 | Widenhoefer et al. |

(Continued)

FOREIGN PATENT DOCUMENTS

| | | |
|---|---|---|
| DE | 19960600 A1 | 6/2001 |
| EP | 0 839 563 A1 | 5/1998 |

(Continued)

OTHER PUBLICATIONS

Dahl Baldwin Marine Diesel Fuel/Water Separators; installation pamphlet; 2005; 9 pages. (1-9).

*Primary Examiner* — Tony G Soohoo
*Assistant Examiner* — Peter Keyworth
(74) *Attorney, Agent, or Firm* — Reinhart Boerner Van Deuren P.C.

(57) ABSTRACT

A filter system having a filter element ejection device is provided. Filter systems according to the present invention may include a filter element that includes an ejection receiver for receiving actuation action from an ejector of a filter housing. The ejector engages the ejection receiver when a user desires to eject the filter element from the filter housing. Typically, the ejector extends through the filter housing and axially ejects the filter element from the housing.

5 Claims, 11 Drawing Sheets

(56) References Cited

U.S. PATENT DOCUMENTS

| | | |
|---|---|---|
| 5,364,528 A | 11/1994 | Schwarz et al. |
| 5,390,701 A | 2/1995 | Lessley et al. |
| 5,486,288 A | 1/1996 | Stanford et al. |
| 5,674,393 A | 10/1997 | Terhune et al. |
| 5,698,093 A | 12/1997 | Pyle et al. |
| 5,744,030 A | 4/1998 | Reid et al. |
| 5,788,859 A | 8/1998 | Biere |
| 5,817,234 A | 10/1998 | Dye et al. |
| 5,837,137 A | 11/1998 | Janik |
| 5,868,932 A | 2/1999 | Guichaoua et al. |
| 5,906,737 A | 5/1999 | Hoeppner |
| 5,938,921 A | 8/1999 | Janik et al. |
| 5,985,142 A | 11/1999 | Belden |
| 6,048,455 A | 4/2000 | Janik |
| 6,068,763 A | 5/2000 | Goddard |
| 6,171,491 B1 | 1/2001 | Popoff et al. |
| 6,187,188 B1 | 2/2001 | Janik et al. |
| 6,193,884 B1 | 2/2001 | Magnusson et al. |
| 6,387,259 B1 | 5/2002 | Roll |
| 6,485,635 B1 | 11/2002 | Gandini et al. |
| 6,488,845 B1 | 12/2002 | Neufeld et al. |
| 6,495,042 B1 | 12/2002 | Knight |
| 6,500,335 B2 | 12/2002 | Janik et al. |
| 6,506,302 B2 | 1/2003 | Janik |
| 6,517,717 B1 | 2/2003 | Håkansson |
| D472,299 S | 3/2003 | Fritze |
| D472,604 S | 4/2003 | Fritze |
| 6,565,746 B1 | 5/2003 | Stamey, Jr. et al. |
| 6,615,990 B1 | 9/2003 | Jokschas et al. |
| 6,652,740 B2 | 11/2003 | Schoess |
| 6,662,954 B2 | 12/2003 | Gottwald-Grill et al. |
| 6,673,250 B2 | 1/2004 | Kuennen et al. |
| 6,723,239 B2 | 4/2004 | Maxwell |
| 6,740,234 B1 | 5/2004 | Williams et al. |
| 6,863,811 B2 | 3/2005 | Janik |
| 6,881,334 B2 | 4/2005 | Janik |
| 6,896,803 B2 | 5/2005 | Cline et al. |
| 6,926,156 B2 | 8/2005 | Wall |
| 6,977,006 B2 | 12/2005 | Reid |
| 7,042,346 B2 | 5/2006 | Paulsen |
| 7,048,488 B1 | 5/2006 | Kuznetsov et al. |
| 7,070,692 B2 | 7/2006 | Knight |
| 7,081,201 B2 | 7/2006 | Bassett et al. |
| 7,390,407 B2 | 6/2008 | Weindorf et al. |
| 2002/0020660 A1 | 2/2002 | Jainek et al. |
| 2002/0139731 A1 | 10/2002 | Michels et al. |
| 2002/0166805 A1 | 11/2002 | Minns et al. |
| 2002/0185454 A1 | 12/2002 | Beard et al. |
| 2003/0178354 A1 | 9/2003 | Wall |
| 2004/0144713 A1 | 7/2004 | Bassett et al. |
| 2005/0056582 A1 | 3/2005 | Patel et al. |
| 2005/0103692 A1 | 5/2005 | Stanhope et al. |
| 2005/0161378 A1 | 7/2005 | Cline |
| 2005/0161386 A1 | 7/2005 | Gustafson et al. |
| 2005/0189288 A1 | 9/2005 | Hershberger et al. |
| 2005/0194317 A1 | 9/2005 | Ikeyama et al. |
| 2006/0016745 A1 | 1/2006 | Nguyen et al. |
| 2006/0016769 A1 | 1/2006 | Hacker et al. |
| 2006/0054547 A1 | 3/2006 | Richmond et al. |
| 2006/0060512 A1 | 3/2006 | Astle et al. |
| 2006/0096934 A1 | 5/2006 | Weinberger et al. |
| 2006/0118475 A1 | 6/2006 | Girondi |
| 2006/0124516 A1 | 6/2006 | Merritt et al. |
| 2006/0151371 A1 | 7/2006 | Weinberger et al. |
| 2006/0180539 A1 | 8/2006 | Wolf et al. |
| 2006/0186031 A1 | 8/2006 | Fick et al. |
| 2006/0191836 A1 | 8/2006 | Dworatzek et al. |
| 2006/0219621 A1 | 10/2006 | Dworatzek |
| 2006/0219626 A1 | 10/2006 | Dworatzek et al. |
| 2007/0215561 A1 | 9/2007 | Yates et al. |
| 2008/0035537 A1 | 2/2008 | Klein et al. |
| 2009/0014381 A1 | 1/2009 | South et al. |
| 2009/0308802 A1 | 12/2009 | Beard et al. |

FOREIGN PATENT DOCUMENTS

| | | |
|---|---|---|
| EP | 0 880 987 A1 | 12/1998 |
| JP | 9173717 A | 7/1997 |
| WO | WO 2007/053228 A2 | 5/2007 |

FILTER WITH EJECTION MECHANISM

CROSS-REFERENCE TO RELATED PATENT APPLICATIONS

This patent application is a Continuation of co-pending U.S. patent application Ser. No. 12/139,559, filed Jun. 16, 2008, the entire teachings and disclosure of which are incorporated herein by reference thereto.

FIELD OF THE INVENTION

This invention generally relates to filters and more particularly to filter arrangements that include a replaceable filter element secured within a reusable filter housing.

BACKGROUND OF THE INVENTION

Filters are used in filtration systems to filter impurities from fluid such as fuels or lubricants, prior to the fluid being used in a downstream system such as an engine or a transmission. Filters typically include filter media which collects and removes the impurities from the fluid. The use of replaceable filters allows the user to replace a relatively inexpensive or easily removable wear part when filter media of the filter, becomes spent, rather than requiring replacement of the entire filtration system.

In some filtration systems, a reusable housing may be employed in which a replaceable filter element is inserted to filter the fluid. When the filter element is spent, the filter element is removed from the housing and replaced with a clean new filter element. In many instances, it may be difficult to remove a filter element from the filter housing due to tight tolerances between seals interposed between the filter element and the housing, locking structure securing the filter element to the housing, build-up of debris or impurities the filter element and filter housing, etc. As such, removal of the spent filter element can be difficult and provide for a very messy experience. More particularly, when a user pulls the filter element out of the housing, the filter element may release suddenly causing a jerking motion which can cause any remaining fluid within the filter element or housing to slop out of the housing. Further, it may be difficult to grasp various filter elements.

There exists, therefore, a need in the art for an improved system and device for more easily and controllably removing replaceable filter elements from a housing. The invention provides such a device. These and other advantages of the invention, as well as additional inventive features, will be apparent from the description of the invention provided herein.

BRIEF SUMMARY OF THE INVENTION

The present invention has several aspects that may be claimed and stand as patentable independently and individually or in combination with other aspects, including but not limited to the following.

In one embodiment, the invention provides a filter element including a ring of filter media, first and second end cap constructions, a center tube, and an ejector receiver. The ring for filter media has opposed first and second ends. The first end cap construction includes a first disc region sealingly connected to a first end of the filter media and a flow port. The second end cap construction is sealingly connected to a second end of the filter media. The center tube has an inlet flow passage connecting the inlet and the inlet port. The ejector receiver is configured to receive the actuation of an ejector.

In another embodiment, the invention provides a filter element for use with a housing having an ejector button. The filter element is adapted to be pushed out of the housing in response to actuation of the ejector button when mounted in the housing. The filter element includes a ring for filter media, a pair of end caps sealingly secured to opposing ends of the filter media, and means for responding to the actuation of the ejector button for facilitating ejection of the filter element.

In one embodiment, a filter assembly including a filter housing, a filter element and an ejector is provided. The filter housing defines a first cavity having an opening. The filter element is insertable into the filter housing through the opening. The filter element includes a ring of filter media, a first end cap construction and a second end cap construction. The ring of filter media has opposed first and second ends. The filter media is mountable within the filter housing. The first end cap construction sealingly connects to the first end of the filter media. The second end cap construction sealingly connects to the second end of the filter media. The ejector mechanism extends through the housing movable between a refracted state in which the ejector mechanism is positioned relative to the housing to permit the filter element to be mounted within the housing and an extended state in which the ejector mechanism translates relative to the housing and interacts with the filter element to axially actuate the filter element relative to the filter housing.

In various embodiments, the filter element may include an ejector receiver in the form of an annular flange formed in one of the end caps or end cap constructions. The ejector receiver may be in the form of a drain pipe of a center tube. The drain pipe may form part of an end cap construction. Further, the ejector may be threadedly secured to the filter housing or may utilize a catch arrangement in the form of a cooperating groove and rib.

Other embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
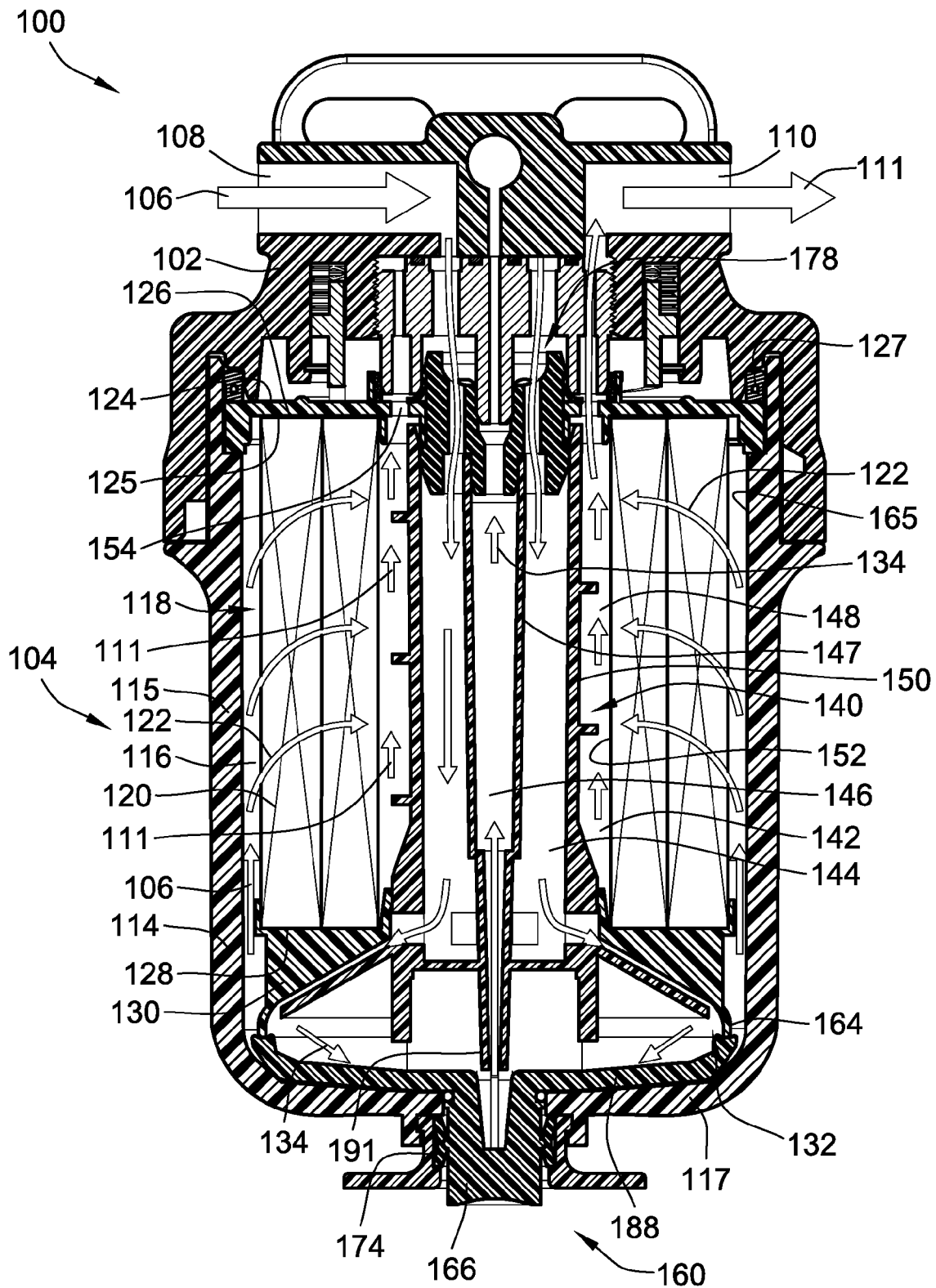
FIG. 1 is a first embodiment of a filter assembly in accordance with the teachings of the present invention, illustrated in cross-section with the filter element in an inserted position.

FIG. 1 illustrates a first embodiment of a filter assembly 100 according to the teachings of the present invention. The filter assembly 100 generally includes a filter base 102 and a filter 104.

The filter 104 connects to the filter base 102 and acts to remove impurities from fluid passing through the filter assembly 100.

Dirty fluid (illustrated as arrows identified with reference numeral 106) enters the filter assembly 100 through a dirty fluid inlet port 108 of the filter base 102. Dirty fluid 106 is supplied from a system such as an engine or from a fluid storage tank such as fuel tank (neither shown). After entering and passing through the filter base 102, the dirty fluid 106 passes through the filter 104 and is cleaned. The clean fluid (illustrated as arrows 111) then exits the filter assembly 100 through clean fluid port 110 of the filter base 102 and travels to the system that utilizes the clean fluid 111.

The filter 104 of FIG. 1 includes an outer housing 114 having an annular side wall 115 that defines an internal cavity 116 that is generally closed at one end by end wall 117. The internal cavity 116 houses a replaceable filter element 118. The filter element 118 includes a tubular ring of filter media 120 which separates impurities from the dirty fluid 106 as it passes therethrough, as illustrated by arrows 122.

A cover, in the form of a top end cap 124 is sealingly connected to a top end 126 of the tubular ring of filter media 120. The cover closes an open end of housing 114 opposite closed bottom end wall 117. In other embodiments, the end cap and cover could be formed as separate components.

To prevent fluid from escaping filter 104, a gasket 127 is mounted to end cap 124 and provides a seal between the end cap 124 and housing 114.

The illustrated filter media 120 is a combination of a pair of concentric rings of filter media. However, alternative filer media could be used. For example, a single tubular ring of filter media could be used.

The sealing connection is generally formed between an inner face 125 of the top end cap 124 and the top end 126 of the ring of filter media 120 to prevent fluid bypass therebetween. By preventing fluid bypass, the dirty fluid 106 is forced to pass through the filter media 120.

The sealing connection between the top end cap 124 and ring of filter media 120 may be provided by any connection. By way of example only, the top end cap 124 may be potted to the ring of filter media 120 using an adhesive such as Plastisol or an epoxy, the ring of filter media 120 may be ultrasonically bonded to the top end cap 124, the ring of filter media 120 may be embedded into the top end cap 124, the end cap 124 may be molded or over molded onto the end of the filter media 120 or any other means of providing a sealing connection may be implemented.

The bottom end 128 of the ring of filter media 120 is sealingly connected to a bottom end cap 130. The bottom end 128 and bottom end cap 130 may be sealingly connected in a similar or different manner as the connection between the top end cap 124 and top end 126.

The top and bottom end caps 124, 130 bound the filter media 120 to prevent bypass or short circuiting of the filter media 120 by dirty fluid 106.

In the illustrated embodiment, the bottom end cap 130 forms a portion of a water separating device, illustrated in the form of a cone separator 132 to assist in separating water from the dirty fluid 106 prior to the dirty fluid 106 passing through the filter media 120. The separated water, illustrated as arrows 134, can then be held in a reservoir 136 between the bottom end cap 130 and the bottom end wall 117 of housing 114 from which the water 134, depending on the embodiment, may ultimately be evacuated from the filter assembly 100 altogether.

The filter assembly 100 further includes a center tube 140 that is positioned within a internal cavity 142 of the tubular ring of filter media 120. The center tube 140 defines outer and inner fluid flow passages 144, 146 that direct separated and oppositely flowing fluid flows of the dirty fluid 106 and separated water 134 between the top and bottom ends 126, 128 of the filter media 120. A center tube may be independently formed from end caps 124, 130; may be integrally formed with one of the end caps; or may be integrally formed with both end caps. The center tube or parts of the center tube may form part of or be provided by an end cap construction as more fully detailed below.

The outer fluid flow passage 144 provides a flow path for dirty fluid 106 through the internal cavity 142 of the filter media 120 to the cone separator 132, while the inner fluid flow passage 146 provides a flow path for the separated water 134 to be evacuated from the filter 104, and ultimately out of the filter base 102. The outer and inner flow passages 144, 146 are separated by an annular wall 147 of the center tube 140.

Additionally, a clean fluid cavity 148 is formed between an outer wall 150 of the center tube 140 and an inner side 152 (or clean fluid side) of the ring of filter media 120. The outer wall 150 of the center tube 140 separates the outer fluid flow passage 144, through which dirty fluid 106 flows, from the clean fluid cavity 148, to prevent mixing of the dirty and clean fluids 106, 111.

The top end cap 124 further defines a clean fluid outlet 154, which fluidly communicates the clean fluid cavity 148 with the exterior of the filter 104, and ultimately with the clean fluid port 110 of the filter base 102. As illustrated, the clean fluid outlet 154 is in the form of a plurality of apertures that pass axially through the top end cap 124.

After the filter element 118 has met its service life and is spent, the filter element 118 may be replaced. To replace the filter element 118, it must be removed from housing 114. However, as it is important to have a good seal between the cover, i.e. top end cap 124 and housing 114 to prevent fluid leakage, gasket 127 can make it difficult to remove the filter element 118 from housing 114. The difficulty in removing the filter element 118 is further provided by difficulty in grasping the filter element 118 to pull the filter element out of housing 114. In addition, impurities may also hinder removal of the filter element 118 from housing 114.

Further, as the filter element 118 is pulled from the filter housing 114, the user may accidentally jerk the filter element 118, which may cause any fluid that remains in the filter 104 to spill and make a mess.

The present embodiment of the invention includes a filter ejector 160 which interacts with an ejection receiver of the filter element 118 for assisting in removal of the filter element 118 from housing 114.

To remove the filter element 118 from the housing 114, the user can bias the filter ejector 160 from a retracted position (see FIG. 1) axially into housing 114 to an extended position (see FIG. 2), such as illustrated by arrow 162. In at least the extended position, the filter ejector 160 will engage the ejection receiver of the filter element 118, illustrated in this embodiment as an annular flange 164 of the bottom end cap 130.

The actuation of filter ejector 160 will cause the filter element 118 to be axially actuated away from end wall 117 and out of the open end of housing 114. The actuation of the filter element 118 will cause gasket 127 to axially disengage from the inner surface 165 of sidewall 115, thereby reducing some of the friction between the filter element 118 and housing 114 restricting or inhibiting removal.

An "ejection receiver" as used herein can take numerous forms and functions to receive the actuation of a filter ejector such that the filter element can be ejected from the filter housing 114. The ejection receiver is a structural component capable of moving the filter element in response to actuation by the ejector. Preferably, the ejection receiver is integral with the remainder of the filter element. For example, the ejection receiver may be a portion of an end cap construction, a center tube or other structural component. Typically, the ejection receiver will be formed at second (and typically bottom) end of the filter element. The ejection receiver may be a structure such as an engagement plate or other engagement surface that is positioned axially and/or radially relative to the remainder of the filter element to facilitate ejection in the event the filter element is installed in such a housing having an ejector. The ejection receiver does not need to be in combination with other components of a filter assembly. In this embodiment, the responding means or ejection receiver takes the form of the annular flange 164. Examples of additional ejection receivers will be more fully developed below.

The ejection receiver is typically formed as part of an end cap construction. An "end cap construction" may be one piece or a plurality of pieces; may include merely an end cap; an end cap in combination with a center tube; an end cap in combination with gaskets; an end cap in combination with components of the water separator. Thus, an ejection receiver may be provided by any of these structures and be considered part of an end cap construction.

Figure 2:
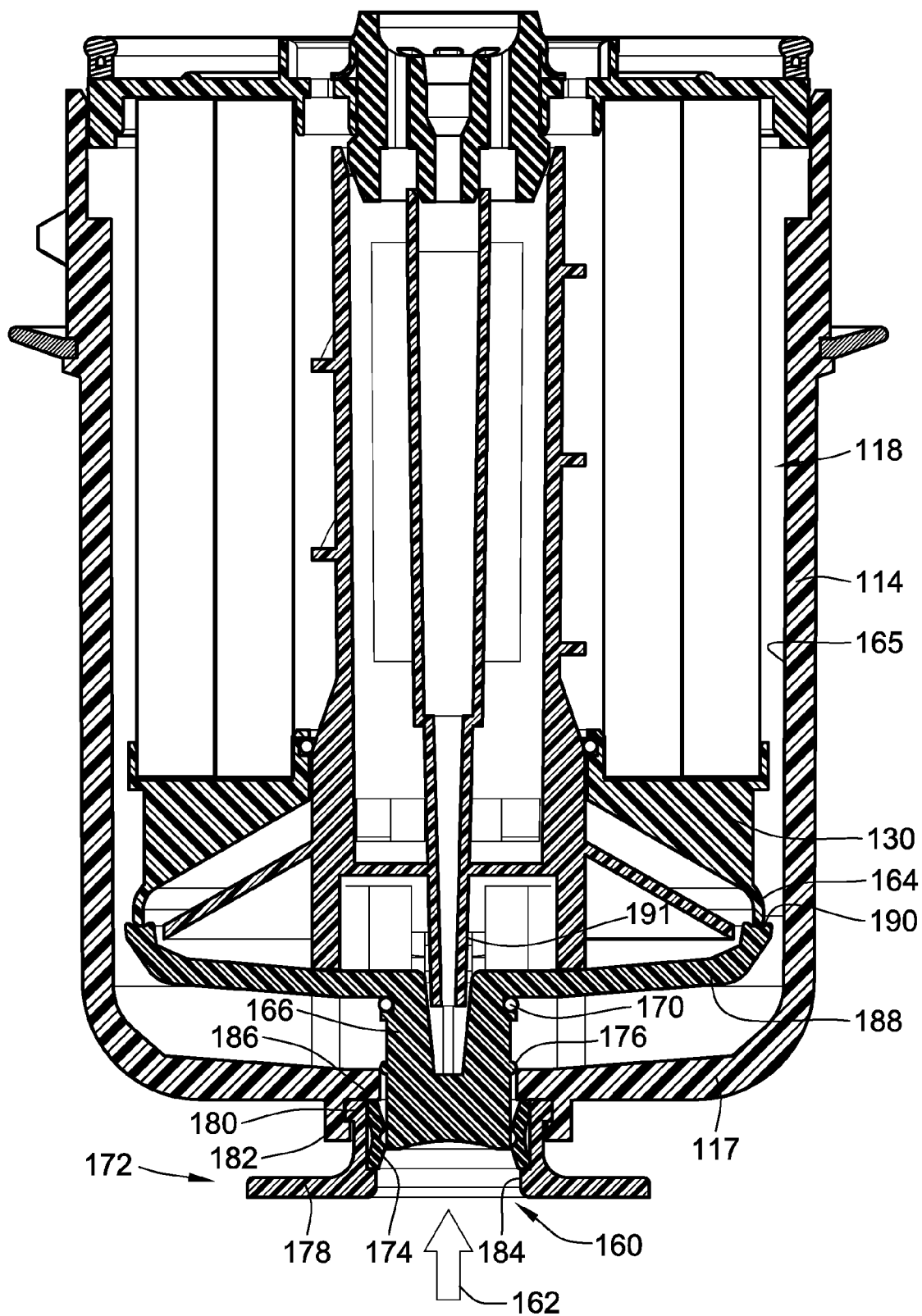
FIG. 2 is a simplified illustration of the embodiment of FIG. 1 with the filter element in an ejected position relative to the filter housing.

The filter ejector 160 of the present embodiment includes a button portion 166 that extends axially through an aperture formed in end wall 117. The button portion 166 may be pressed by a user, such as illustrated by arrow 162 (see FIG. 2), to actuate the filter ejector 160 toward and into engagement with filter element 118. The user continues to press the button portion 166 into housing 114 to actuate the filter element 118 a sufficient axial distance to dislodge filter element 118 from housing 114, as illustrated in FIG. 2. More particularly, gasket 127 is dislodged from inner surface 165.

To prevent fluid from leaking from housing 114 when the filter 104 is in use, a seal is formed between end wall 117 and button portion 166 by o-ring 170. O-ring 170 could be mounted to housing 114 rather than button portion 166. Such an arrangement may be beneficial such that a seal may always be provided between button portion 166 and end wall 117 even if the ejector 160 is pushed axially into housing 114, such as in the extended state (i.e. FIG. 2) so as to prevent any fluid that may remain in the filter from leaking during replacement.

A retainer arrangement 172 secures the filter ejector 160 in the retracted position. The retainer arrangement 172 includes a spring member 174 that includes a radially inward facing groove that engages a cooperating radially outward extending rib 176 formed on button portion 166. The interaction between the spring member 174 and the rib 176 prevents the axial movement of the filter ejector 160 relative to housing 114 until a predetermined load is applied by the user to button portion 166 along biasing direction 162.

The retainer arrangement 172 further includes a collar 178 that snap engages to the end wall 117 of the housing 114. The collar 178 includes a radially outward extending shoulder 180 that engages a corresponding radially inward extending shoulder 182 of end wall 117 to secure the collar to the housing 114.

The spring member 174 is axially secured between a radially inward extending shoulder 184 of the collar 178 and a disc-shaped portion 186 of bottom end wall 117 surrounding the aperture through end wall 117.

When a user applies a sufficient biasing force 162 to button portion 166, the spring member 174 and/or rib 176 will deflect such that the filter ejector 160 can be biased into housing 114 to an extended position to engage and eject the filter element 118 from housing 114.

With the filter element "ejected" the engagement between gasket 127 and housing 114 is broken such that the user can easily remove the spent filter element 118 from housing 114.

The filter ejector 160 is reset into a retracted position when a new filter element 118 is inserted axially into housing 114. The filter element 118 will bias the filter ejector 160 back through aperture 182, such that rib 176 engages spring member 174.

In this particular embodiment, the filter ejector 160 acts on the annular flange 164 which forms a radially outer rim of the bottom end cap 130. The ejector 160 includes a plurality of radially extending arms 188 that transfer the loading applied to button portion 166 to the ejection receiver, i.e. annular flange 164. The arms 188 include cupped grooves 190 that mate with the axial free end of the annular flange 164.

The arms 188 of the ejector 160 are integrally connected to one another via button 166. Button 166 further includes a relief cavity axially opening in a direction extending toward the filter element 118 to receive drain pipe 191, if necessary.

Figure 3:
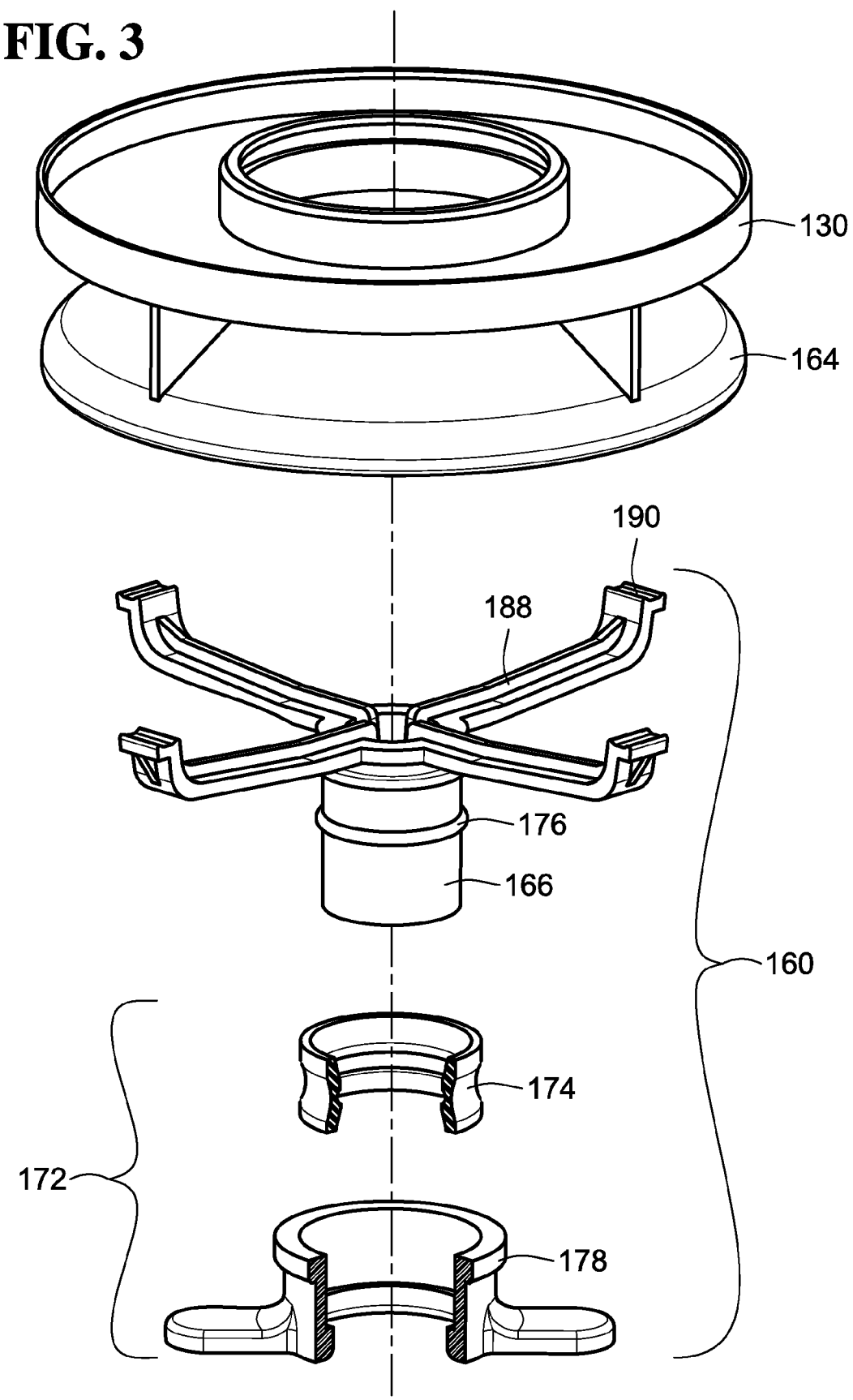
FIG. 3 is a top exploded illustration of the ejector of FIG. 1, in perspective.
Figure 4:
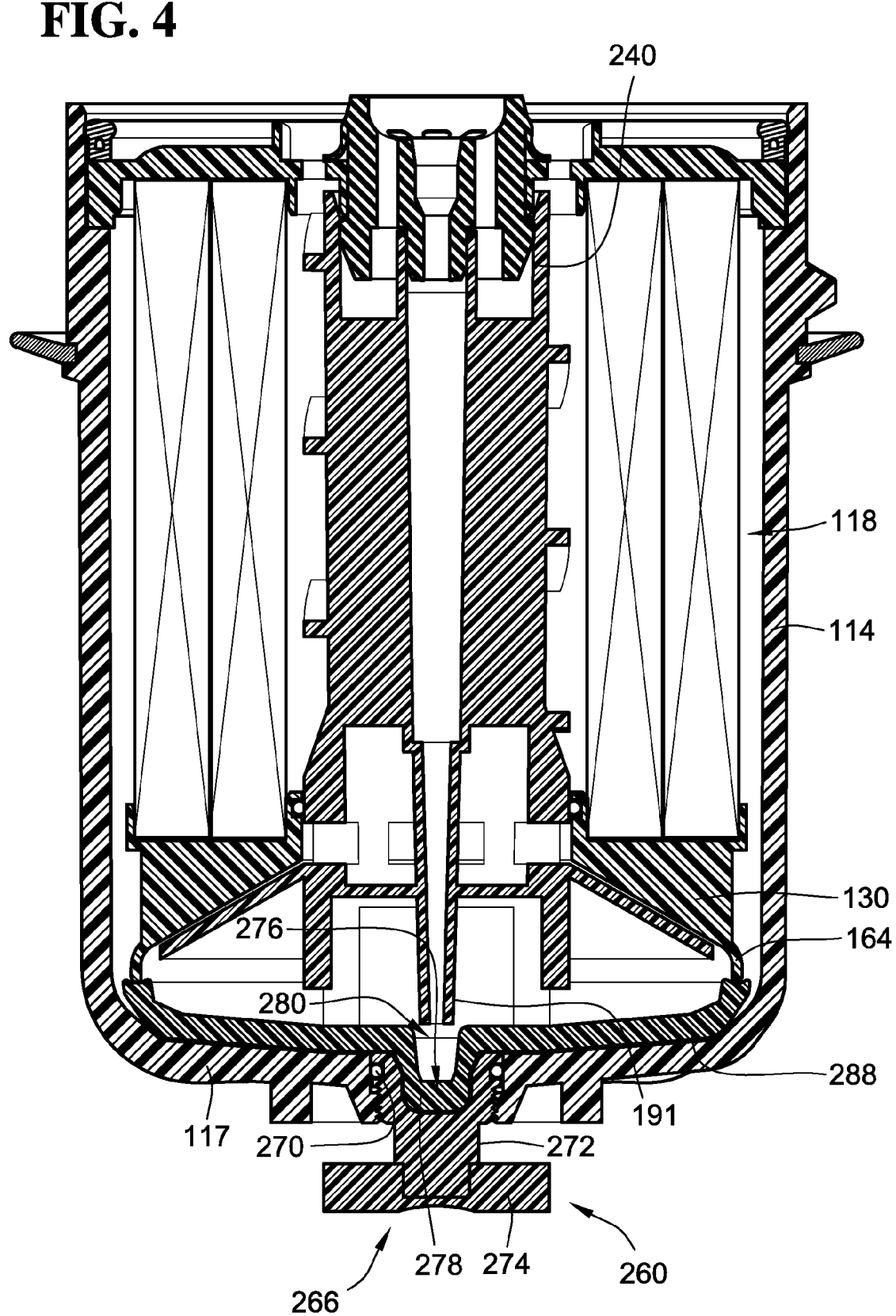
FIG. 4 is a cross-sectional illustration of a further embodiment of a filter element and ejector arrangement, with the filter element in an inserted position.
Figure 5:
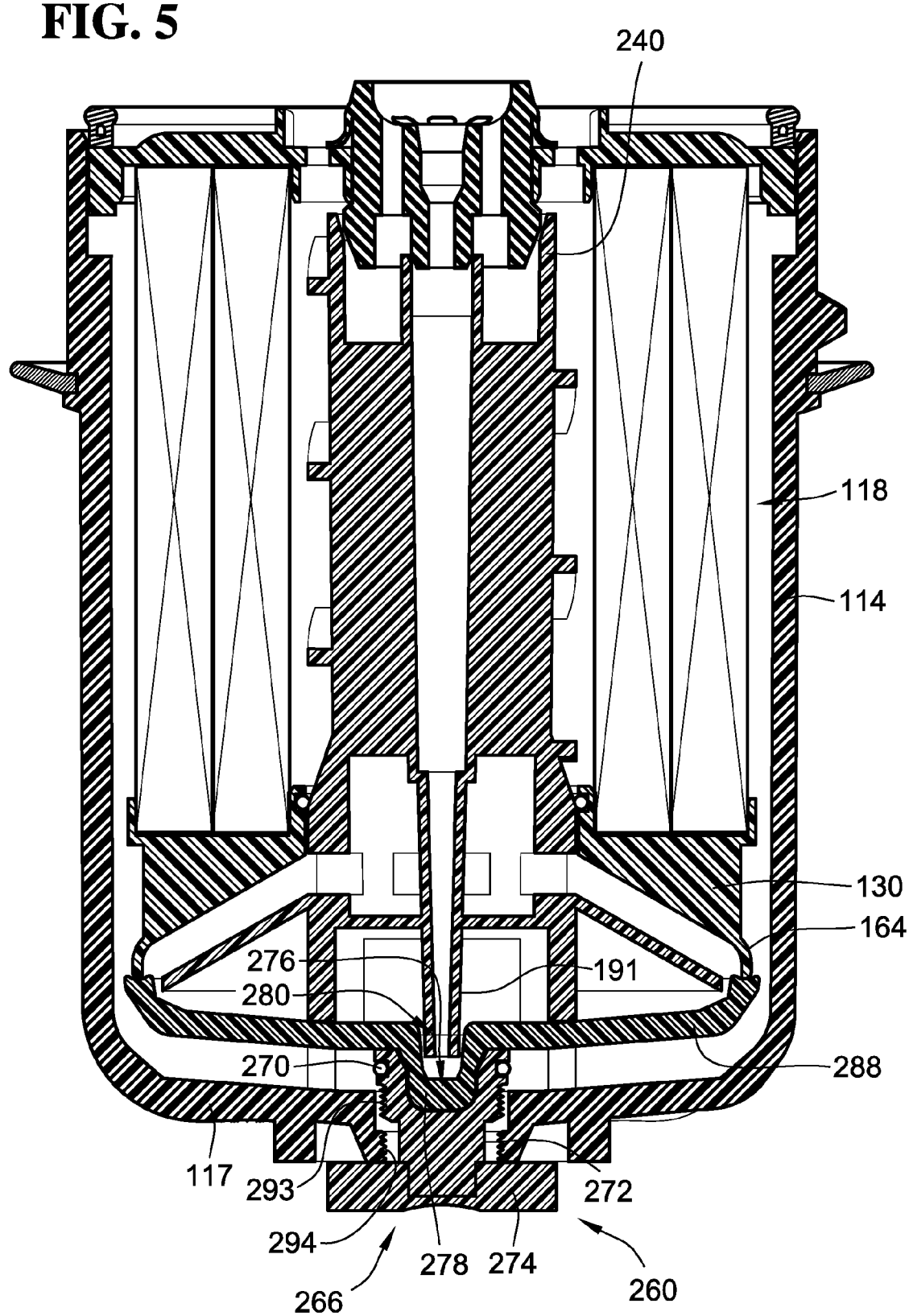
FIG. 5 is a cross-sectional illustration of the embodiment of FIG. 4 with the filter element in an ejected position.

Another embodiment of a filter ejector 260 is illustrated in FIGS. 4 and 5. This embodiment is similar to the previously illustrated embodiment of FIGS. 1-3 in that it includes a plurality of radially extending arms 288 that are integrally connected to one another. The arms 288, again, engage an annular flange 164 of the bottom end cap 130 of the filter element 118.

In this embodiment, the button portion 266 includes two components including a neck portion 272 that extends through an aperture in the bottom end wall 117 and a locking handle 274 mounted to the neck portion 272. O-ring 270 seals the neck portion 272 relative to end wall 117 to prevent fluid leakage when the button portion 266 is in a retracted condition.

The neck portion 272 include a receptacle 276 that receives an axially extending hub portion 278 from which arms 288 radially extend. The interaction and engagement between hub portion 278 and receptacle 276 coordinates movement of the two components. Thus, actuation of the neck portion 272 similarly actuates arms 288 and vice versa.

Locking handle 274 is threadedly mounted to the neck portion 272 such that it can be used to secure the filter ejector 260 within the end wall 117 as well as provide a handle upon which a user can push when ejecting a filter element 118 from the housing 114.

As more clearly illustrated in FIG. 5, the neck portion 272 includes threads 293 and end wall 117 includes cooperating threads 294. These threads 293, 294 interact to secure the ejector 260 in a retracted state (see FIG. 4). The user can unthread the neck portion 272 from end wall 117 and then axially push on handle 274 to further eject filter element 118.

Hub portion 278 includes a cavity 280 facing into the housing 114 toward element 118 that receives the end of the drain tube 191, if necessary, when the filter ejector 260 is in the extended position to prevent interference between the center tube 140 and the filter ejector 260.

Figure 6:
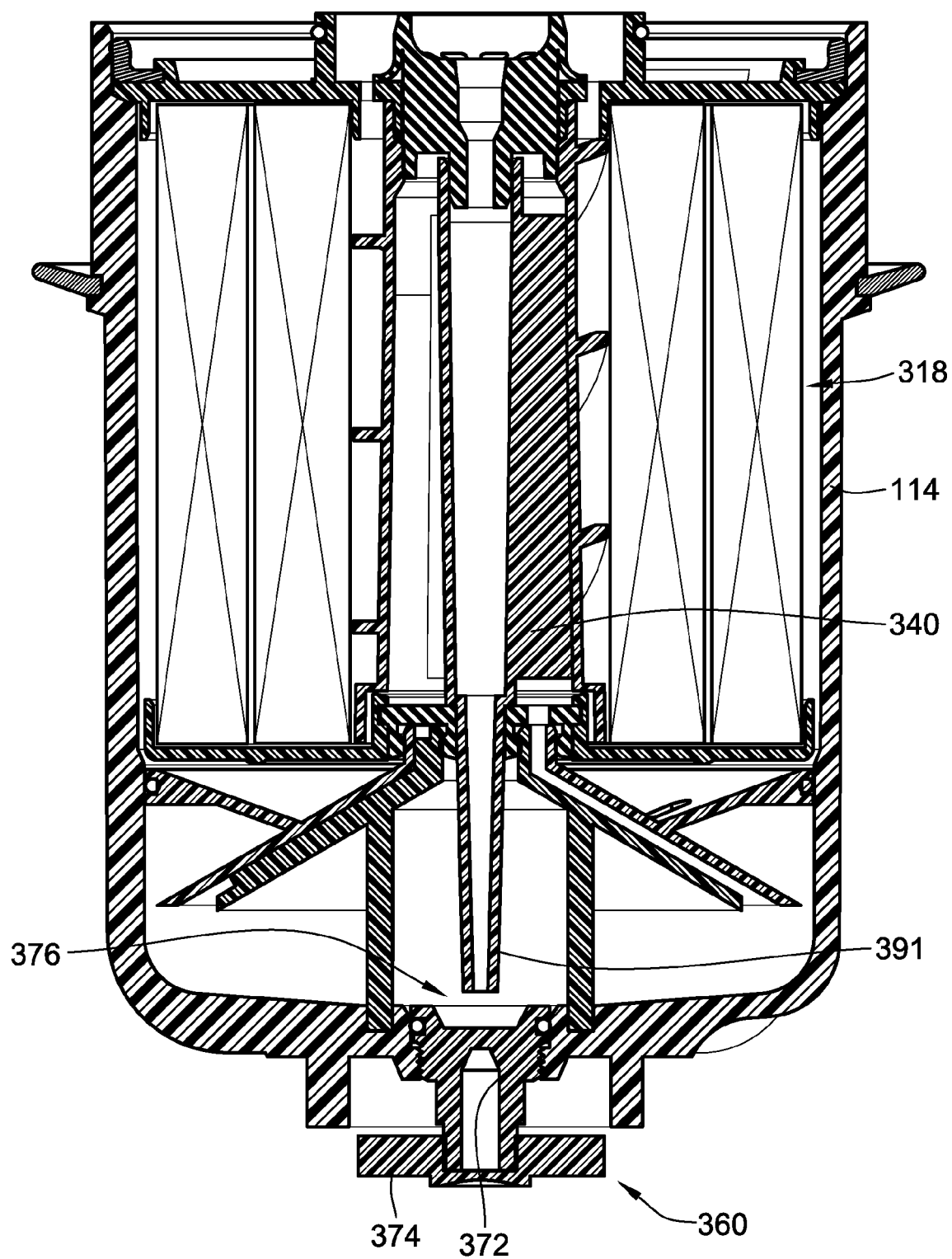
FIG. 6 is a cross-sectional illustration of a further embodiment of a filter element and ejector arrangement, with the filter element in an inserted position.
Figure 7:
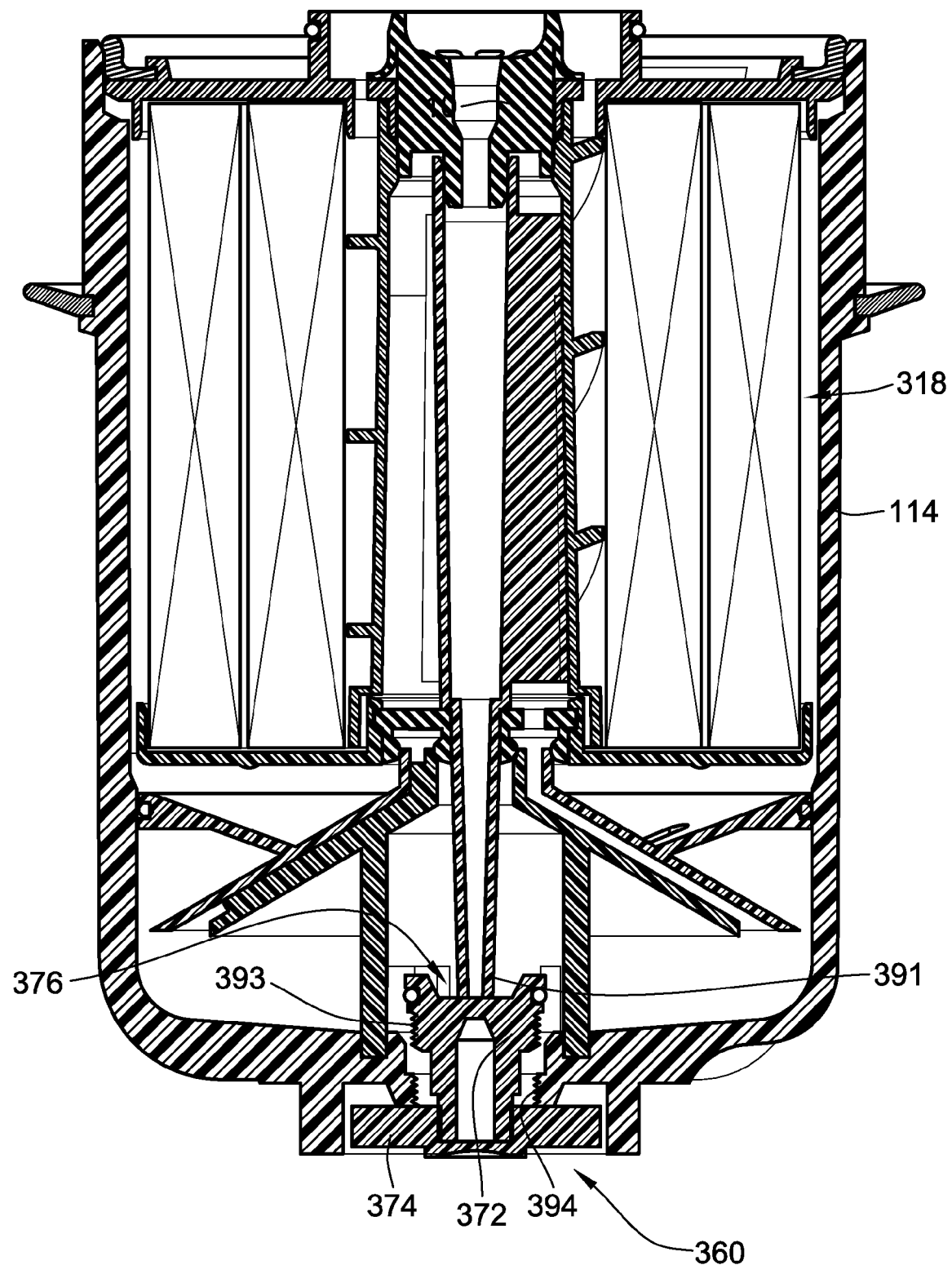
FIG. 7 is a cross-sectional illustration of the embodiment of FIG. 6 with the filter element in an ejected position.

A further embodiment of a filter ejector 360 is illustrated in FIGS. 6 and 7. In this embodiment, the neck portion 372 directly engages the end of the drain tube 391 while ejecting the filter element 318 from housing 114 (see FIG. 7). As such, the drain tube 391 is an ejection receiver configured to receive the actuation of the filter ejector 360. Thus, this embodiment illustrates the ejection receiver being formed as part of the center tube 340. The center tube 340 and/or at least drain tube 391 would be considered part of an end cap construction.

Neck portion 372 includes a cavity 376 which receives the free end of drain tube 391. The neck portion 372 again is connected to a handle 374 for assisting in positioning and threading the ejector 360 to end wall of the housing 114. Also, handle 374 provides a device upon which the user can press to eject filter element 318 from the housing 114. Again, threads 393 of the neck portion 372 engage threads 394 of the end wall of housing 114.

Figure 8:
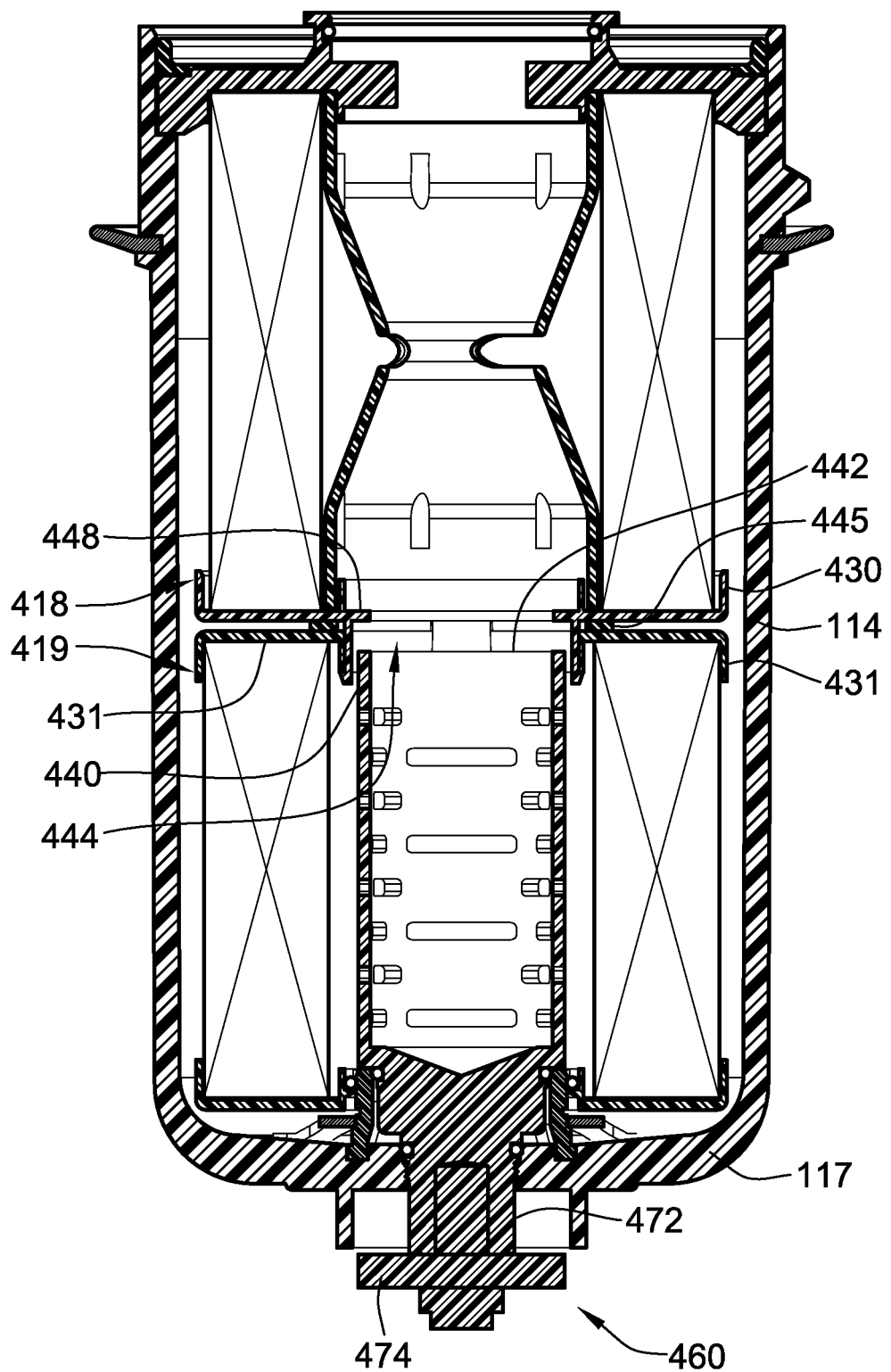
FIG. 8 is a cross-sectional illustration of a further embodiment of a filter element and ejector arrangement, with the filter element in an inserted position.
Figure 9:
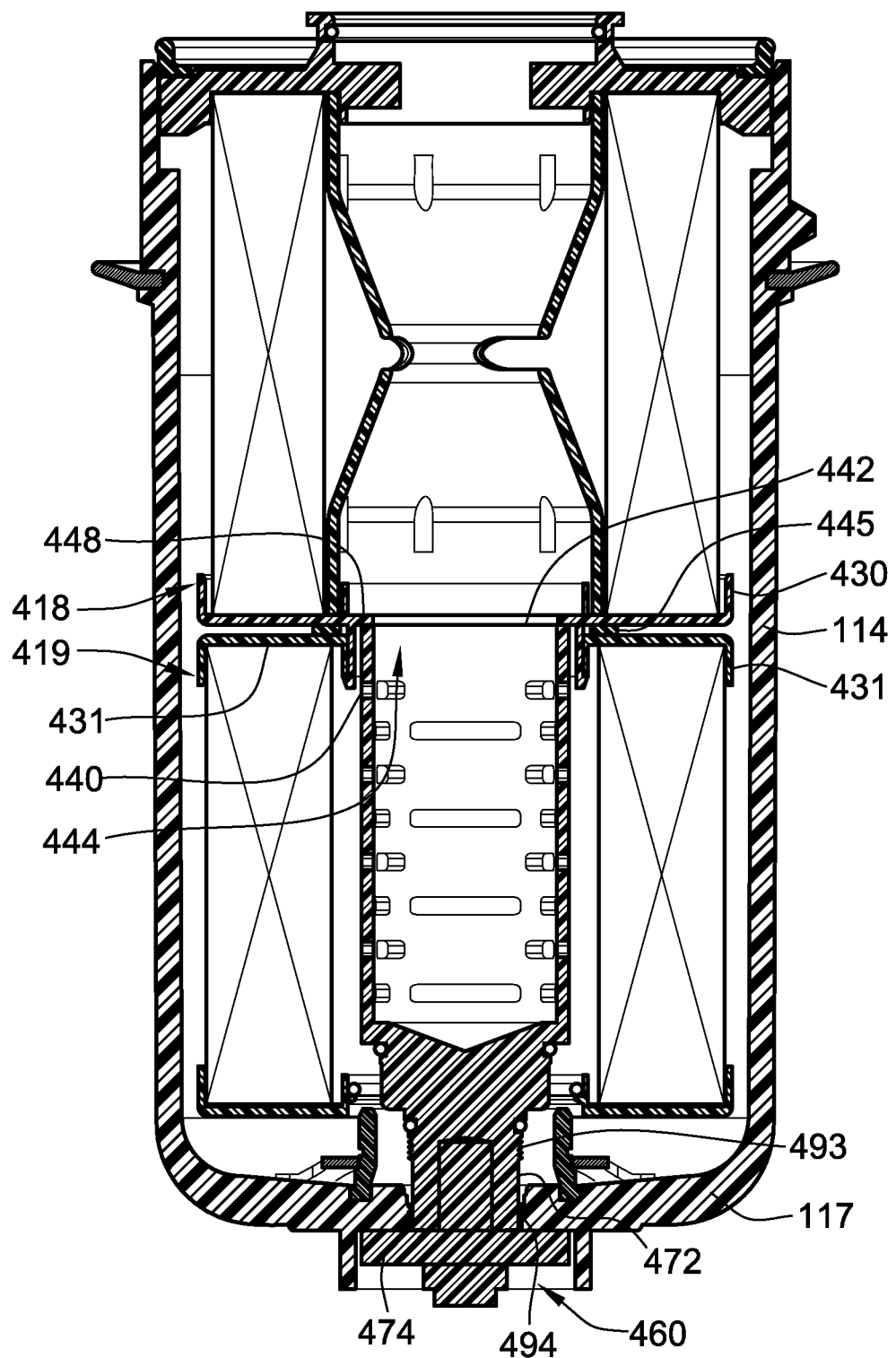
FIG. 9 is a cross-sectional illustration of the embodiment of FIG. 8 with the filter element in an ejected position.
Figure 10:
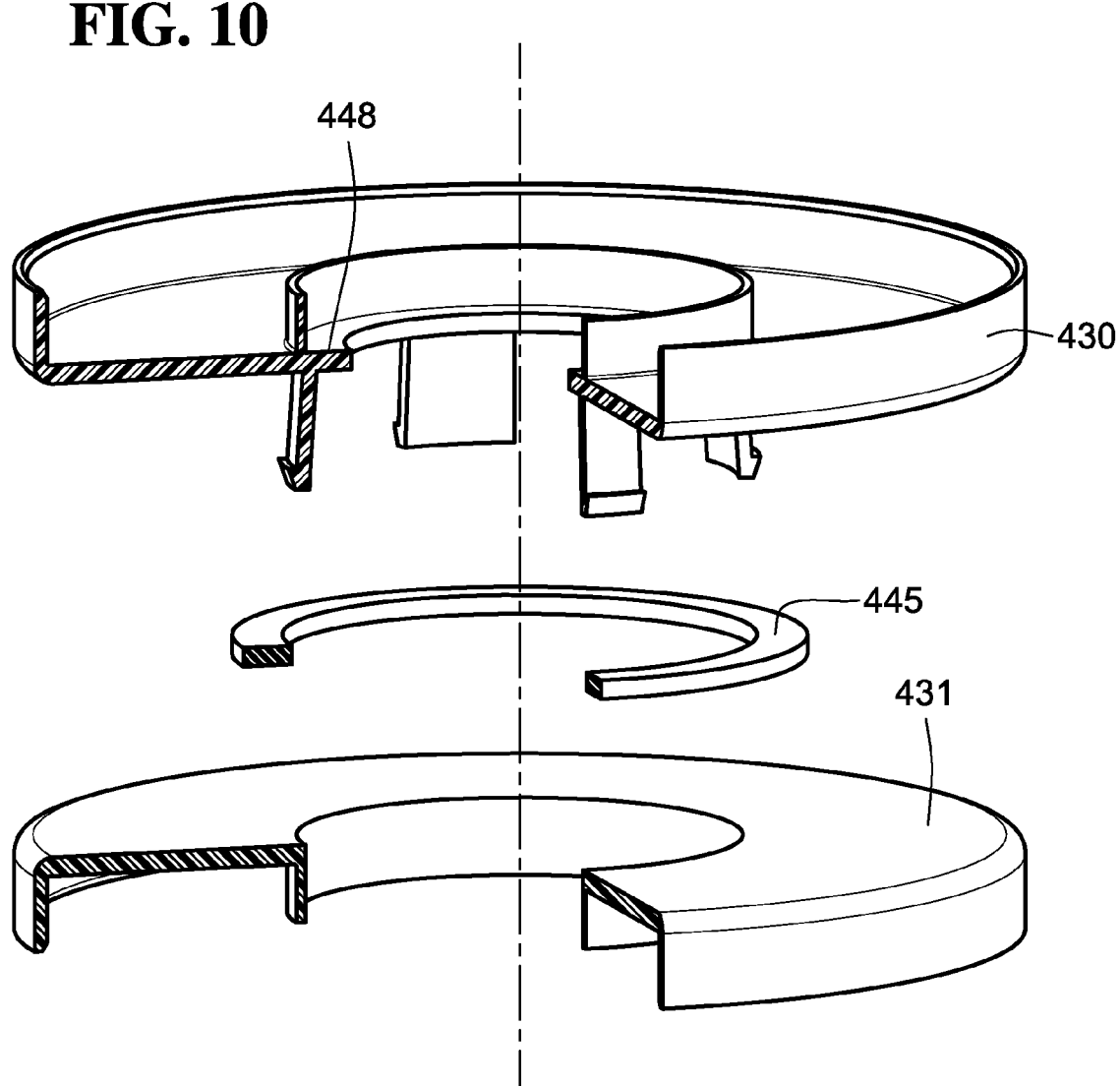
FIG. 10 is an exploded illustration of the arrangement of the mating end caps of the filter elements of the embodiment of FIG. 8.

An additional embodiment of a filter ejector 460 is illustrated in FIGS. 8-10. In this embodiment, the ejector 460 includes part of a center tube 440 that extends axially through a bottom filter element 419 and engages a bottom end cap 430 of a top filter element 418 (see FIG. 9).

The center tube 440 is integrally formed with the neck portion 472 that extends through the bottom end wall 117 of housing 114 and includes an attached handle portion 474.

A distal end 442 of the center tube 440 is received in a cavity 444 formed by bottom end cap 430 and top end cap 431 of bottom filter element 419. The cavity 444 is formed by an axially extending sidewall of top end cap 431 and a disc portion 448 of bottom end cap 430 projecting radially inward beyond the sidewall. The disc portion 448 defines a central aperture through which fluid may flow between the top and bottom filter elements 418, 419. The cavity 444 and disc portion 448 form an ejection receiver and receive actuation action from the ejector 460 so as to assist in removing the filter elements 418, 419 from housing 114.

In the illustrated embodiment, the top end cap 431 of the bottom filter element 419 snap engages the bottom end cap 430 of the top filter element 418. Further, a seal is formed between bottom end cap 430 and top end cap 431 by gasket 445 to prevent fluid bypass therebetween. As the two end caps 430, 431 are connected together, actuation of the top filter element 418 results in actuation of bottom filter element 419.

Figure 11:
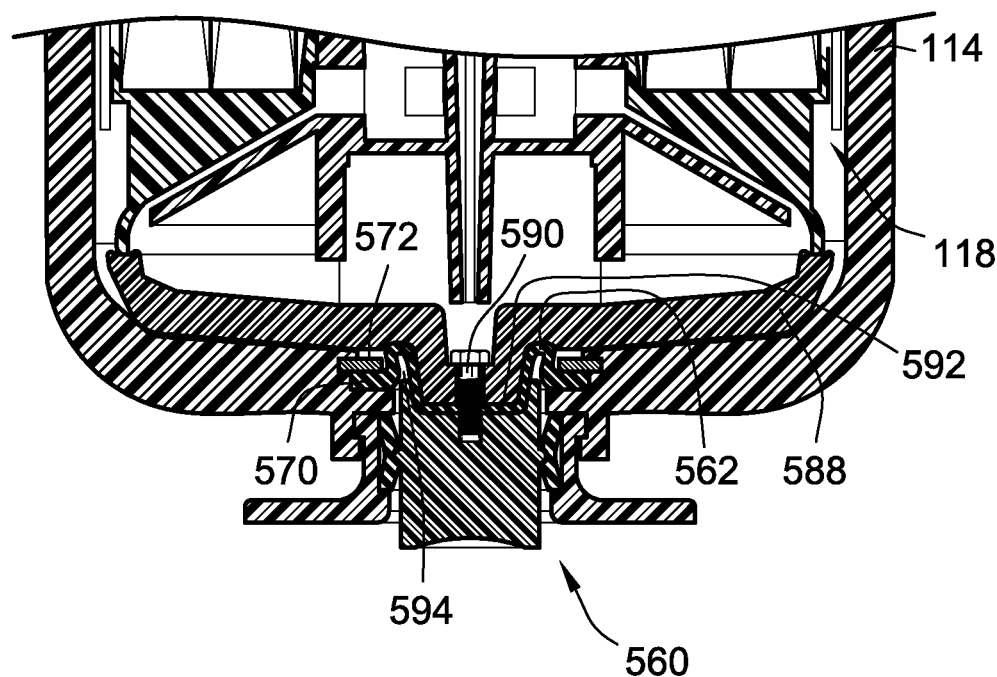
FIGS. 11 and 12 illustrate a further embodiment of an ejector arrangement according to the teachings of the present invention with improved leak prevention.
Figure 12:
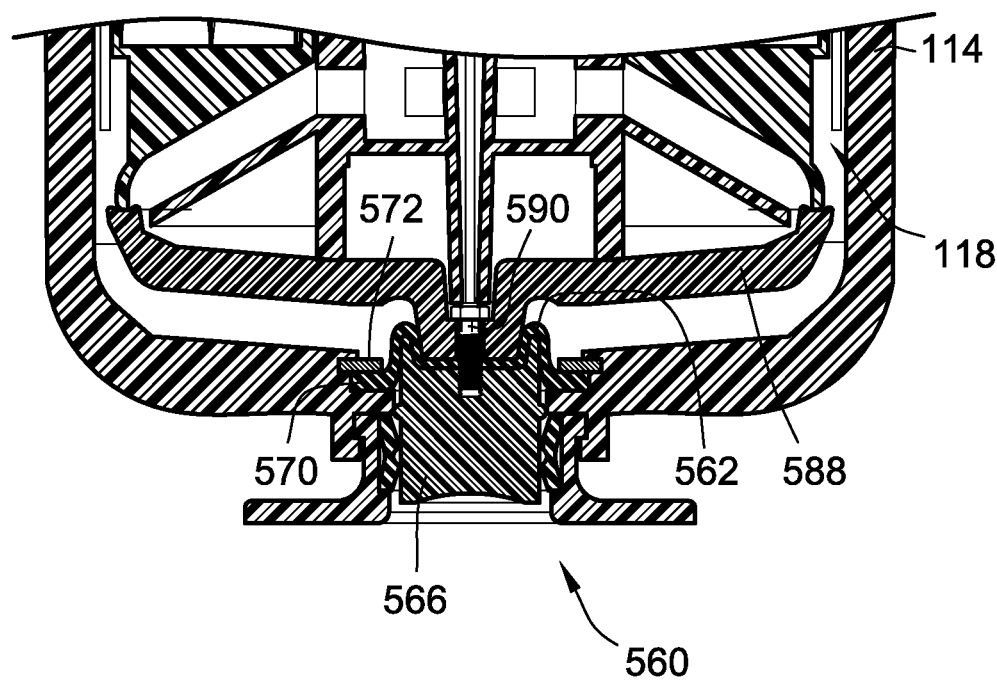

A further embodiment according to the teachings of the present invention is illustrated in FIGS. 11 and 12. This embodiment is similar to the embodiment in FIG. 1. Only the primary differences between the two embodiments will be discussed. In this embodiment, the filter ejector 560 implements a different sealing arrangement to further prevent any residual waste fluid in the filter assembly from leaking after the filter element 118 is ejected from housing 114.

The sealing arrangement includes a diaphragm 562 sealingly connected to the housing 114 and the button portion 566 of ejector 560. The diaphragm 562 allows the user to push button portion 566 into housing 114 without breaking a seal between the housing 114 and the ejector 560.

The diaphragm 562 is a generally circular member that has a radially outer section 570 axially secured to the housing by an retainer 572. The annular retainer 572 could be a snap ring that is received in a groove formed in housing 114. However, other structure can be used to secure the diaphragm 562 to the housing 114.

In this embodiment, the arm portion 588 of the ejector 560 are not integrally formed with the button portion 566. Instead, the button portion 566 and arm portion 588 are separate bodies that are axially secured to one another by a connector in the form of bolt 590. The arm portion 588 and button portion 566 axially sandwich a radially inner portion 594 of the diaphragm 562 and form a seal therebetween.

In the un-ejected position, i.e. with the filter element 118 fully seated in housing 114, the excess portion of diaphragm 562 is folded over on itself within cavity 594 formed between the housing 114 and arm portion 588. When the ejector 560 is actuated to eject the filter element 118 from the filter housing 114, the diaphragm unrolls but maintains a seal so as to prevent any fluid from leaking through the end wall of the housing 114.

Other arrangements of incorporating a diaphragm may be implemented. Further, a diaphragm can be implemented in other ones of the various embodiments so as to prevent leakage.

Further yet, in o-ring type sealing arrangements, the o-ring can be repositioned so as to prevent disengagement of the o-ring with the housing 114 or components of the housing so as to prevent the formation of a leak path through the housing. The prevention of a leak path avoids unnecessarily providing the opportunity of any of the residual fluid in the filter arrangement from spilling or making a mess after a spent filter element 18 is ejected.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element, comprising:
    a ring of filter media having opposed first and second ends;
    a first end cap construction including a first disc region sealingly connected to a first end of the filter media, the first end cap having a flow port;
    a second end cap construction sealingly connected to a second end of the filter media;
    a center tube having an inlet flow passage connecting an inlet of the filter element and the flow port;
    an ejector receiver configured to receive the actuation of an ejector, the ejector receiver formed integrally with the second end cap construction and forming a distal end thereof, wherein the ejector receiver is disposed radially outward of an inner most periphery of the ring of filter media;
    wherein the ejector receiver is an annular flange extending axially from an end cap portion of the second end cap construction, in a direction extending axially away from the ring of filter media; and
    wherein the annular flange forms a radially outermost rim portion of the second end cap construction.

2. The filter element of claim 1, wherein the ejector receiver has a curved outer periphery.

3. A filter element for use with a housing having an ejector button, the filter element adapted to be pushed out of the housing in response to actuation of the ejector button when mounted in the housing, the filter element comprising:
    a ring for filter media having opposing first and second ends, the first end disposed above the second end;
    a center tube having an inlet flow passage fluidly communicating the first end with the second end;
    a pair of end caps sealingly secured to the opposing first and second ends of the ring of filter media, respectively;
    an ejector receiver adjacent the second end of the ring of filter media for responding to the actuation of the ejector button for facilitating ejection of the filter element, the ejector receiver extending to a distal end which is disposed below the second end of the filter media, wherein the ejector receiver is disposed radially outward of an inner most periphery of the ring of filter media;
    wherein the ejector receiver is an annular flange extending axially from the second end cap in a direction extending from the ring of filter media; and
    wherein the annular flange forms a radially outermost rim portion of the second end cap.

4. The filter element of claim 3, wherein the ejector receiver for responding to the actuation of the ejector button includes an annular rim portion of one of the end caps.

5. The filter element of claim 3, wherein the ejector receiver for responding to the actuation of the ejector button includes a disk portion of one of the end caps.

* * * * *

UNITED STATES PATENT AND TRADEMARK OFFICE
CERTIFICATE OF CORRECTION

PATENT NO.         : 8,603,335 B2  
APPLICATION NO.    : 13/547235  
DATED              : December 10, 2013  
INVENTOR(S)        : John H. Beard et al.

Page 1 of 1

It is certified that error appears in the above-identified patent and that said Letters Patent is hereby corrected as shown below:

In the claims:

Column 10, Claim 3, line 23, "extending" should read -- extending axially away --.

Signed and Sealed this  
Fourth Day of March, 2014

Michelle K. Lee  
*Deputy Director of the United States Patent and Trademark Office*